United States Patent [19]

Axelrod et al.

[11] Patent Number: 5,337,358
[45] Date of Patent: Aug. 9, 1994

[54] APPARATUS FOR RECORDING A TRANSACTION INCLUDING AUTHENTICATING AN IDENTIFICATION CARD

[75] Inventors: Barry H. Axelrod, Trumbull; John T. Balga, Jr., Stratford; Edward P. Cornell, Newtown, all of Conn.

[73] Assignee: Pitney Bowes Inc., Stamford, Conn.

[21] Appl. No.: 979,113

[22] Filed: Nov. 20, 1992

[51] Int. Cl.⁵ .................. H04L 9/32; H04L 9/30; G06F 15/21
[52] U.S. Cl. .......................... 380/23; 380/4; 380/22; 380/24; 380/25; 380/30; 380/49; 380/50; 235/379; 235/380; 340/825.31; 340/825.34; 364/409
[58] Field of Search ............... 235/379, 380; 380/23-25, 3, 4, 22, 30, 49, 50; 240/825.31, 825.34; 364/408, 409

[56] References Cited

U.S. PATENT DOCUMENTS

| | | | |
|---|---|---|---|
| 4,663,622 | 5/1987 | Goldman et al. | 340/825.34 |
| 4,995,081 | 2/1991 | Leighton et al. | 380/23 |
| 5,097,504 | 3/1992 | Camion et al. | 380/23 |
| 5,131,038 | 7/1992 | Puhl et al. | 380/23 |
| 5,135,569 | 8/1992 | Mathias | 106/22 |
| 5,136,647 | 8/1992 | Haber et al. | 380/49 |
| 5,142,578 | 8/1992 | Matyas et al. | 380/21 |
| 5,157,726 | 10/1992 | Merkle | 380/23 |
| 5,159,635 | 10/1992 | Wang | 380/51 |
| 5,163,091 | 11/1992 | Graziano et al. | 380/25 |
| 5,180,906 | 1/1993 | Yamada | 235/487 |
| 5,189,700 | 2/1993 | Blandford | 380/23 |
| 5,191,613 | 3/1993 | Graziano et al. | 380/25 |

OTHER PUBLICATIONS

PhotoTrace in Automatic ID News by Greg Smith Minneapolis, No Date Given.

Primary Examiner—Bernarr E. Gregory
Attorney, Agent, or Firm—Robert H. Whisker; Melvin J. Scolnick

[57] ABSTRACT

Apparatus for recording a transaction where the transaction includes authenticating an identification card; the card having information pertaining to an object or other entity to be identified on a first portion in human recognizable form, and a coded representation of an encrypted signal comprising a representation of the information on a second portion. The apparatus includes a controller, a scanner for reading the coded representation, a decoder for decoding that representation, a decrypter for decrypting the decoded signal and a display for displaying the representation of the information. In one embodiment the information includes an image of the object or other entity to be recognized and the card may be authenticated by comparing the displayed representation with the image printed on the card the card also includes a text message pertaining to the object or other entity and the apparatus includes a replaceable memory, printer, or communications link for recording at least a portion of this text message. In accordance with another aspect of the disclosure the signal is encrypted using a public key encryption system and an encrypted decryption key is appended to the encrypted message, and is recovered by the apparatus to decrypt the message.

15 Claims, 1 Drawing Sheet

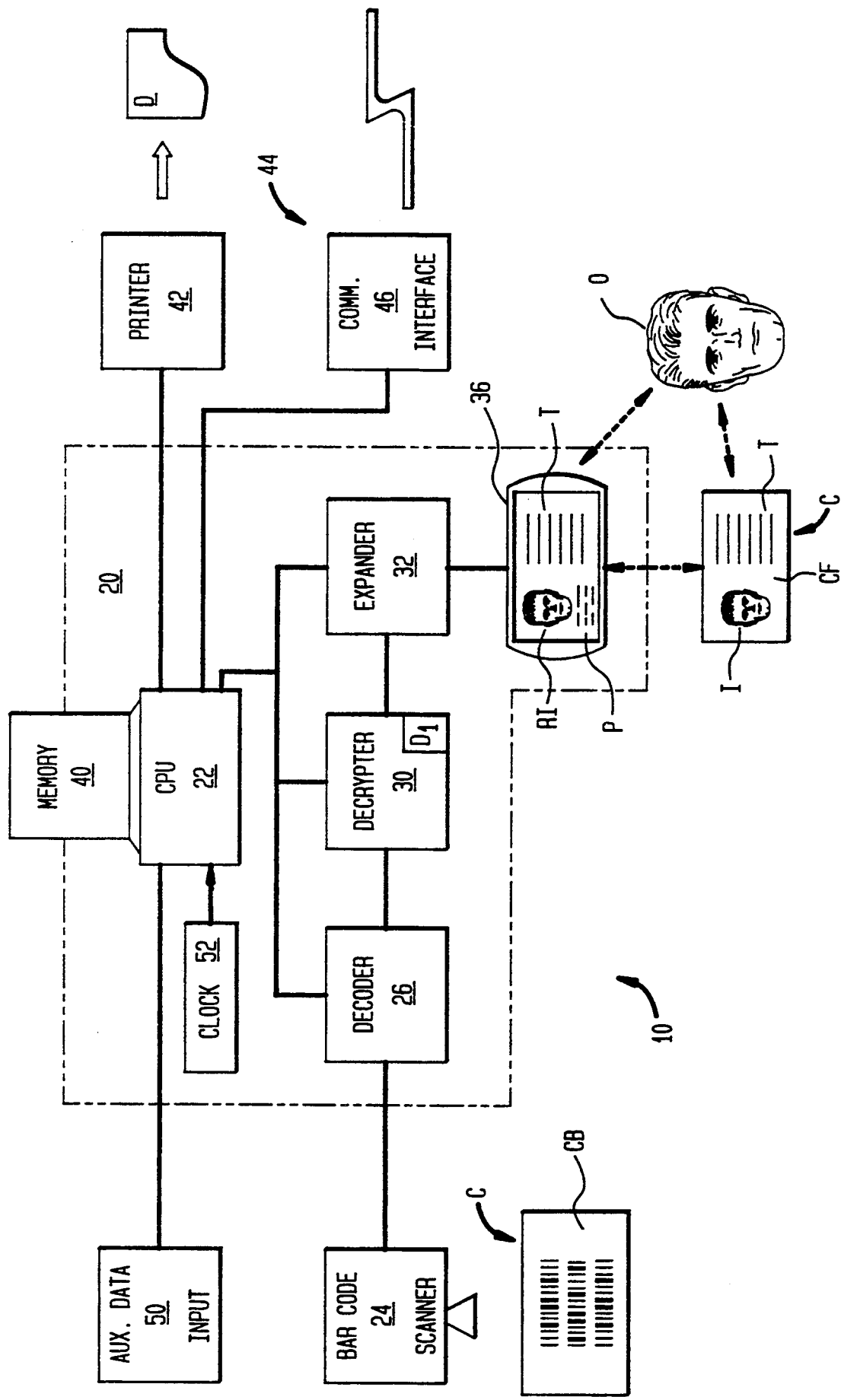

APPARATUS FOR RECORDING A TRANSACTION INCLUDING AUTHENTICATING AN IDENTIFICATION CARD

RELATED APPLICATIONS

The present application shares elements of disclosure and claims subject matter related to that of commonly assigned U.S. patent application Ser. No.: 07/979,081, filed on Nov. 20, 1992, by: James R. Marcus.

BACKGROUND OF THE INVENTION

The subject invention relates to an apparatus for recording a transaction; the transaction including authentication of an identification card. The identification card contains information pertaining to an object or other entity to be identified on a first portion of the card in human recognizable form, and a coded representation of an encrypted signal comprising a representation of the information on a second portion of the card. Such a card is disclosed and claimed in the above mentioned, commonly assigned U.S. patent application.

The problem of proving the identity, status or characteristics of a person or other object or entity is ancient. Both history and fiction are full of tales of passwords, tokens, signet rings, etc. intended to prove identity, and the consequences which followed from their loss. In more recent times highly sophisticated instruments which measure fingerprints, voice prints, retinal patterns and the like to identify individuals have been developed. While very useful where a high degree of security is required the expense, complexity, and need for such systems to access a database of characteristics of persons to be recognized, and the need to secure and continually update this database has limited such systems to applications such as controlling access to extremely sensitive areas.

Thus, the most common form for proving the identity of a person is the identification card. Typically, such an identification card will include information about the identity, status or characteristics of the person authorized to process the card, and may include some means, such as a seal, to reduce the possibility of forgery. (As used herein the term "identification card" is intended to include not only typical identification cards and similar items such as drivers licenses and employee badges, but is also intended to include any item which may be suitably carried by a person or associated with an object or other entity to be identified, and which is capable of containing information pertaining to such a person, object or other entity and a coded representation of an encrypted signal comprising a representation of such information.)

In addition, to establishing the identity, status or other characteristics of a person or other object or entity, it is frequently desirable to establish that someone or something was in a particular place at a particular time. For example, a police officer might wish to establish that a motorist or other person had been stopped at a particular place and time, the immigration service of a country might wish to establish that a person had entered or left the country at a particular inspection point at a particular time, or an inspection or testing facility might wish to establish that a particular object had been delivered at a particular time.

Accordingly, it is an object of the subject invention to provide an apparatus for recording a transaction including authentication of an identification card.

BRIEF SUMMARY OF THE INVENTION

The above object is achieved and the disadvantages of the prior art are overcome in accordance with the subject invention by means of an apparatus for recording a transaction where the transaction includes authenticating an identification card; the identification card having information pertaining to an object or other entity to be identified on a first portion in human recognizable form, and a coded representation of an encrypted signal comprising a representation of the information on a second portion. The apparatus includes a controller for controlling the operation of the apparatus and a mechanism for reading the coded representation of the signal from the card. A decoder for a decoding the representation of the signal and a decrypter are also included for decoding and decrypting the signal. A display is responsive to the decrypter for displaying the representation of the information; so that the identification card may be authenticated by comparison of the information on the first portion of the card with the displayed representation of the information. The apparatus also includes a recorder responsive to the controller for recording data and the controller is responsive to the decrypter to reformat at least a part of the decrypted signal and to control the recorder to record the reformatted signal.

In accordance with various aspects of the subject invention the recorder may include a non-volatile, removable memory card, or a printer, or a communications link for transmitting the reformatted information to a central location for recording or other purposes.

In accordance with another aspect of the subject invention the apparatus may include a mechanism for the input of additional data to be appended to the recorded information. Typical such additional information might be vehicle speed information where the apparatus of the subject invention is used by a police officer to authenticate a driver's license and issue a speeding ticket.

In accordance with still another aspect of the subject invention the encrypted signal is encrypted using an encryption key $E_i$, for a public key encryption system and the corresponding decryption key, $D_i$ is encrypted with an encryption key $E_1$ for the public key encryption system to form an encrypted decryption key $E_1[D_i]$ and the encrypted key is appended to the encrypted signal. Further in accordance with this aspect of the subject invention the apparatus stores a decryption key, $D_1$, corresponding to key $E_1$ and decrypts the encrypted key $E_1[D_i]$ to recover the decryption key, $D_i$, and then decrypts the encrypted signal using the key $D_i$.

BRIEF DESCRIPTION OF THE DRAWINGS

FIG. 1 shows a schematic block diagram of an apparatus in accordance with the subject invention.

DETAILED DESCRIPTION OF PREFERRED EMBODIMENTS OF THE SUBJECT INVENTION

Apparatus 10 includes a signal processing system 20 which further includes a central processing unit 22 for control of apparatus 10. Control of apparatus 10 consist of implementation of well known data processing functions including data input, control of peripherals such as displays, printers and communications interfaces, and control of the sequencing of data through various known processes as will be described further below. Such control functions are well within the skill of those in the data processing art and need not be discussed further here for an understanding of the subject invention.

Apparatus 10 is intended for use in conjunction with a card C having a front CF and a back CB. Card C serves as an identification card for an object or other entity, typically a person.

Front CF contains information in human recognizable form pertaining to the object or other entity to be identified. Typically, a person 0 will be identified by an image I and also by a text message T printed on card front CF. Back CB contains a coded representation of an encrypted signal comprising a representation of image I. In accordance with a preferred embodiment of the subject invention the encrypted signal on back CB may also include at least part of text message T. In accordance with another preferred embodiment of the subject invention the encrypted signal comprises a compressed representation of image I.

A more complete description of the construction of card C is provided in the above mentioned, commonly assigned U.S. patent application, which is hereby incorporated by reference, and a further description of the construction of card C is not believed necessary for an understanding of the subject invention.

In operation scanner 24 scans back CB to produce a signal representative of the coded representation on back CB. The signal is input to decoder 26 to be decoded in a conventional manner. Preferably the coded signal will be coded as a two dimensional barcode such as the PDF-417 standard barcode developed by the Symbol Technology Corporation of New York. However, it is within the contemplation of the subject invention that the coded representation may be stored in any convenient medium, for example in memory of a smart card or of a memory card. Alternatively, in suitable applications, card C may comprise a magnetic storage medium such as a floppy disk and the signal may be coded suitably for recording on such medium.

After decoding to recover the encrypted signal the encrypted signal is input to decrypter module 30.

The signal may be encrypted using any convenient method of encryption and may be decrypted using the corresponding known, conventional algorithms.

In a preferred embodiment the signal is encrypted using a public key encryption system such as the well known RSA system, using an encryption key $E_i$. The corresponding decryption key $D_i$ is encrypted using another encryption key, $E_1$, for the public key system and the encrypted decryption key, $E_1[D_i]$ is appended to the encrypted message. Decrypter module 30, in accordance with this embodiment, stores the corresponding decryption key, $D_1$, which is used to decrypt key $D_i$, which is in turn used to decrypt the encrypted message.

A more detailed description of this method of authenticating a message or signal is given in U.S. Pat. No. 4,853,961; to: Pastor; for: "Reliable Document Authentication System; issued: Aug. 1, 1989, which is hereby incorporated by reference.

In accordance with a preferred embodiment of the subject invention a representation of image I is comprised in the encrypted signal in a compressed form. Image I may be compressed using any suitable image signal compression algorithm such as the known, commercially available JPEG algorithm. Accordingly, in accordance with this embodiment, after decryption the decrypted signal is expended by expander module 32 to produce a representation RI of image I which is displayed on display 36 together with text message T.

Those skilled in the art will recognize that representation RI will appear somewhat degraded with respect to image I because of the compression. However, with improvements in storage technology, or the use of high capacity storage media, it is within the contemplation of the subject invention that the need for signal compression may be reduced or eliminated and representation RI may correspond substantially exactly to image I.

As is described in the above referenced commonly assigned U.S. patent application display 36 may then be compared to card C and an operator may compare image I to representation RI and the printed text message T to the displayed text message T to authenticate card C, and card C and display 36 may be compared to person 0 for identification.

In another preferred embodiment of the subject invention the encrypted signal may also include a password known to person 0 which is displayed on display 36 after decryption as a further means of identification. Of course, in this embodiment the password would not be printed on card front CF.

In another preferred embodiment of the subject invention password T is not displayed but is appended to a record, as will be described further below, to authenticate that the record has been produced as part of an authentication transaction for card C.

In accordance with the subject invention CPU 22 captures at least a portion of text message T and reformats it for recording on a permanent medium. In one such embodiment the portion of message T may be downloaded to a replaceable non-volatile memory 40 for later transfer to permanent storage. Memory 40 may comprise any suitable medium, including but not limited to magnetic medium, EPROM, or battery-backed RAM. Such memories and their use are well known and need not be described further here for an understanding of the subject invention.

In another such embodiment a portion of message T or Image I may be printed by printer 42 in a conventional manner.

In still another such embodiment a portion of message T or Image I may be transmitted over a communication link 44 through communications interface 46. Link 44 may comprise any suitable technology, including but not limited to, modem connection to a telephone line, cellular phone technology, or radio transmission. These technologies too are well known to those skilled in the art and need not be discussed further here for an understanding of the subject invention.

In accordance with another preferred embodiment of the subject invention additional data relating to the authentication transaction may be appended to the record of message T.

For example, in an application of the subject invention where a police officer authenticates a driver's license in the process of issuing a traffic ticket it may be desired to append additional data relating to the traffic ticket to the record. In one such embodiment auxiliary data input 50 would comprise a radar gun or similar device for measuring vehicle speed. In another such embodiment auxiliary data input 50 would comprise a breathalyzer for input of data representative of the blood alcohol content of person 0.

In other applications, where it is desired to record the exact geographic position at which a transaction occurred input 50 would comprise a receiver for the Global Positioning System, which is a well known satellite based system for determining geographic position.

In still another such application the time of the transaction may be appended to the record and may be input from system clock 52.

In still another application additional data may be entered manually through a keyboard, keypad, touch screen or other suitable, conventional apparatus for manual entry of data.

Each of these technologies for the input of auxiliary data is well known to those skilled in the art and need not be described further here for an understanding of the subject invention.

The detailed description of preferred embodiments set forth above has been provided by way of illustration only, and other embodiments of the subject invention will be apparent to those skilled in the art from consideration of the above description and the attached drawing. Accordingly, limitations on the subject invention are to be found only in the claims set forth below.

What is claimed is:

1. An apparatus for recording a traffic violation and for authenticating a driver's license, said driver's license having information in humanly recognizable form and pertaining to a licensed driver to be identified, on a first portion of said driver's license, and a coded representation of an encrypted signal comprising a representation of said information on a second portion, said apparatus comprising:
    a) control means for controlling the operation of said apparatus;
    b) means for reading said coded representation of said signal from said card;
    c) decoding means, responsive to said reading means for decoding said representation of said signal to provide a decoded signal;
    d) decrypting means for decrypting said decoded signal to provide a decrypted signal;
    e) display means, responsive to said decrypting means, for displaying said representation of said information; whereby
    f) said driver's license can be authenticated by comparison of said information on said first portion with said displayed representation of said information; and
    g) auxiliary data input means for determining and inputting additional data relating to said traffic violation; and
    h) recording means, responsive to said control means, for recording data; and wherein
    i) said control means is responsive to said decrypting means to further control said recording means for record at least a portion of said decrypted signal, and is responsive to said auxiliary data input means to control said recording means to record said additional data in association with said portion of said decrypted signal.

2. An apparatus as described in claim 1 wherein said recording means comprises a non-volatile, removable memory card.

3. An apparatus as described in claim 1 wherein said recording means comprises a printer.

4. An apparatus as described in claim 1 wherein said recording means comprises a communications link for transmitting said portion of said decrypted signal to a central location for recording.

5. An apparatus as described in claim 1 wherein said auxiliary data input means comprises a clock for determination and input of time data.

6. An apparatus as described in claim 1 wherein said additional data input means comprises means for determination and input of speed data for a moving object.

7. An apparatus as described in claim 1 wherein said auxiliary data input means comprises means for determination and input of data indicative of said licensed driver's blood alcohol content.

8. An apparatus as described in claim 1 wherein said auxiliary data input means comprises a position indication information receiver for determination and input of data representative of the position of said apparatus.

9. An apparatus as described in claim 1 wherein said encrypted signal is encrypted using an encryption key, $E_i$, for a public key encryption system.

10. An apparatus as described in claim 9 wherein a decryption key $D_i$, corresponding to said key $E_i$, is encrypted with an encryption key $E_1$ for said public key encryption system to form an encrypted decryption key $E_1[D_i]$ and said encrypted key $E_i[D_i]$ is appended to said encrypted signal, and said decrypting means further comprises:
    a) means for decrypting said encrypted decryption key, $E_1[D_i]$ with a corresponding decryption key $D_1$, to recover said decryption key, $D_i$; and,
    b) means for decrypting said encrypted signal using said key, $D_i$.

11. An apparatus as described in claim 1 wherein said information pertaining to said licensed driver comprises a representation of a signal representative of an image of said licensed driver.

12. An apparatus as described in claim 11 wherein said encrypted signal comprises a password appended to said information for display with said information.

13. An apparatus as described in claim 11 wherein said encrypted signal is encrypted using an encryption key $E_i$, for a public key encryption system.

14. An apparatus as described in claim 13, wherein a decryption key $D_i$, corresponding to said key $E_i$, is encrypted with an encryption key $E_1$ for said public key encryption system to form an encrypted decryption key $E_1[D_i]$, and said encrypted decryption key $E_1[D_i]$ is appended to said encrypted signal, and said decrypting means further comprises:
    a) means for decrypting said encrypted decryption key, $E_1[D_i]$ with a corresponding decryption key $D_1$, to recover said decryption key, $D_i$ and,
    b) means for decrypting said encrypted signal using said key, $D_i$.

15. An apparatus for recording a transaction, said transaction including authenticating an identification card, said card having information in humanly recognizable form and pertaining to an object or other entity to be identified on a first portion of said identification card and a coded representation of an encrypted signal comprising an representation of said information on a second portion, said apparatus comprising:
    a) control means for controlling the operation of said apparatus;
    b) means for reading said coded representation of said signal from said card;
    c) decoding means, responsive to said reading means, for decoding said representation of said signal to provide a decoded signal;

d) decrypting means for decrypting said decoded signal to provide a decrypted signal;
e) display means, responsive to said decrypting means, for displaying said representation of said information, whereby
f) said card can be authenticated by comparison of said information on said first portion with said displayed representation of said information; and,
g) recording means, responsive to said control means for recording data; wherein,
h) said control means is responsive to said decrypting means to control said recording means to record at least a portion of said decrypted signal, and wherein;
i) said encrypted signal is encrypted using an encryption key, $E_i$, for a public key encryption system, and a decryption key $D_i$, corresponding to said key $E_i$, is encrypted with an encrypted key $E_1$ for said public key encryption system to form an encryption decryption key $E_1[D_i]$ and said encrypted key $E_i[D_i]$ is appended to said encrypted signal, and said decrypting means further comprises;
i1) means for decrypting said encrypted decryption key, $E_1[D_i]$ with a corresponding decryption key $D_1$, to recover said decryption key, $D_i$; and,
i2) means for decrypting said encrypted signal using said key, $D_i$.

* * * * *